United States Patent
Ogawa et al.

(10) Patent No.: US 11,885,709 B2
(45) Date of Patent: Jan. 30, 2024

(54) ENGINE TEST METHOD, COMPUTER-READABLE RECORDING MEDIUM, AND ENGINE TEST APPARATUS

(71) Applicant: TRANSTRON INC., Yokohama (JP)

(72) Inventors: Masatoshi Ogawa, Yokohama (JP); Takuma Degawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 0 days.

(21) Appl. No.: 17/891,624

(22) Filed: Aug. 19, 2022

(65) Prior Publication Data

US 2023/0063634 A1 Mar. 2, 2023

(30) Foreign Application Priority Data

Aug. 26, 2021 (JP) .................. 2021-138026

(51) Int. Cl.
*G01M 15/05* (2006.01)
(52) U.S. Cl.
CPC .................. *G01M 15/05* (2013.01)
(58) Field of Classification Search
CPC ...................................................... G01M 15/05
See application file for complete search history.

(56) References Cited

U.S. PATENT DOCUMENTS

| | | |
|---|---|---|
| 2009/0192774 A1 | 7/2009 | Urano |
| 2019/0080606 A1 | 3/2019 | Niwa et al. |
| 2020/0233087 A1 | 7/2020 | Sekiguchi et al. |
| 2021/0017923 A1 | 1/2021 | Aso et al. |
| 2022/0050018 A1* | 2/2022 | Ogawa ............... F02D 41/1456 |
| 2022/0050768 A1* | 2/2022 | Ogawa ............... G06F 18/214 |

FOREIGN PATENT DOCUMENTS

| | | |
|---|---|---|
| DE | 10 2013 206 297 A1 | 10/2014 |
| JP | 2019-51775 | 4/2019 |
| JP | 2020-118514 | 8/2020 |
| WO | WO 2020/196003 A1 | 10/2020 |

OTHER PUBLICATIONS

European Search Report dated Dec. 19, 2022, in European Application No. 22 19 1675.

* cited by examiner

*Primary Examiner* — Eric S. McCall
(74) *Attorney, Agent, or Firm* — STAAS & HALSEY LLP

(57) ABSTRACT

A method including acquiring a first test pattern in which an operation variable for an engine test is changed in time series, inputting a first operation variable to a mathematical model representing a time series response obtained by inputting a test pattern as a simulation of the engine test, monitoring a first monitoring parameter obtained by inputting the first operation variable to the mathematical model, holding the first operation variable until the first monitoring parameter is less than a first threshold value, creating a history of the first operation variable in the simulation as a second test pattern, monitoring a second monitoring parameter obtained by inputting a second operation variable to a real engine based on the second test pattern, holding the second operation variable until the second monitoring parameter is less than a second threshold value, acquiring time series data of the second operation variable and a controlled variable.

27 Claims, 9 Drawing Sheets

FIG.6

| MONITORING PARAMETER | OPERATION VARIABLE | | | |
|---|---|---|---|---|
| | FUEL INJECTION AMOUNT (AMOUNT OF FUEL INJECTED FROM INJECTOR) | TURBINE OPENING DEGREE | EGR VALVE OPENING DEGREE | ITH VALVE OPENING DEGREE |
| AIR EXCESS RATIO | | | - | - |
| INTAKE MANIFOLD PRESSURE | | | | - |
| INTAKE MANIFOLD TEMPERATURE | | | - | - |
| EXHAUST MANIFOLD PRESSURE | | | - | - |
| EXHAUST MANIFOLD TEMPERATURE | | - | - | - |
| MAXIMUM CYLINDER PRESSURE RISE RATE | | - | - | - |

ENGINE TEST METHOD, COMPUTER-READABLE RECORDING MEDIUM, AND ENGINE TEST APPARATUS

CROSS-REFERENCE TO RELATED APPLICATION(S)

This application is based upon and claims the benefit of priority of the prior Japanese Patent Application No. 2021-138026, filed on Aug. 26, 2021, the entire contents of which are incorporated herein by reference.

FIELD

The embodiment discussed herein is related to an engine test method, a computer-readable recording medium, and an engine test apparatus.

BACKGROUND

It is known that, in a technology for constructing engine models, it is possible to construct engine models with high accuracy by using transient operation data on automobile engines. Engine tests conducted using transient operations are conducted under various conditions by comprehensively changing operation variables with time that are input to an engine. Accordingly, before the test, a range of the operation variable in which the engine does not enter an abnormal state is searched.

However, searching for the range of the operation variable is performed in a steady operation, so that, in some cases, a difference may occur in an operation boundary affected by the dead time or the time constant of a system during a transient operation. Accordingly, a test pattern is repeatedly created by manually adjusting the operation boundary through trial and error while detecting engine abnormality, such as degradation of exhaust gas or an accidental fire. However, if it takes a long time for trial and error adjustment, there is a problem in that man-hours of the entire of the engine test including preparations needed before the test increases.

SUMMARY

According to an aspect of an embodiment, an engine test method that causes a computer to execute a process including, acquiring, by a processer on the computer, a first test pattern in which an operation variable that is used for an engine test is changed in time series, inputting, based on the first test pattern, a first operation variable to a mathematical model that represents a time series response of an engine obtained by inputting a test pattern as a simulation of the engine test, monitoring, as a first monitoring parameter of engine abnormality, at least one of an air excess ratio, pressure and temperature of an intake manifold, pressure and temperature of an exhaust manifold, and a maximum cylinder pressure rise rate that are obtained by inputting the first operation variable to the mathematical model, holding, when the first monitoring parameter exceeds a first threshold value, the first operation variable until the first monitoring parameter is less than the first threshold value, creating, a history of the first operation variable in the simulation as a second test pattern, monitoring, as a second monitoring parameter, at least one of the air excess ratio, the pressure and the temperature of the intake manifold, the pressure and the temperature of the exhaust manifold, and the maximum cylinder pressure rise rate that are obtained by inputting a second operation variable to a real engine based on the second test pattern, holding, when the second monitoring parameter exceeds a second threshold value, the second operation variable until the second monitoring parameter is less than the second threshold value, and acquiring, time series data of the second operation variable and a controlled variable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a combination of a monitoring parameter and an operation variable according to the present embodiment;

DESCRIPTION OF EMBODIMENT(S)

Preferred embodiments of the present invention will be explained with reference to accompanying drawings. Furthermore, the present embodiment is not limited by the embodiments. In addition, each of the embodiments may be used in any appropriate combination as long as processes do not conflict with each other.

Example of Entire Configuration

Figure 1:
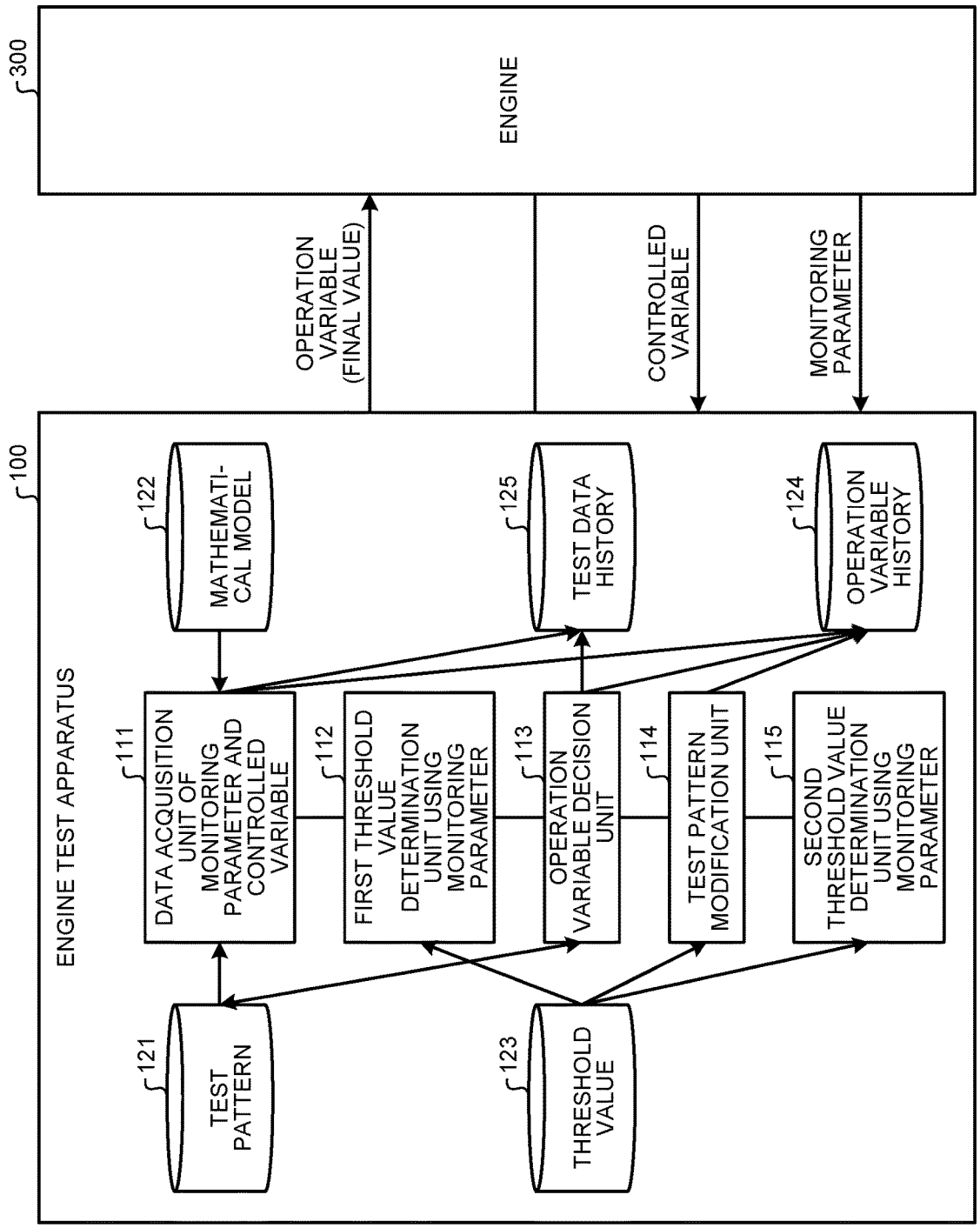
FIG. 1 is a diagram illustrating a configuration example of an engine test system according to a present embodiment.

A configuration of an engine test system according to the present embodiment will be described with reference to FIG. 1. FIG. 1 is a diagram illustrating the configuration example of the engine test system according to the present embodiment. As illustrated in FIG. 1, the engine test system includes the engine test apparatus 100 and an engine 300. The engine test apparatus 100 and the engine 300 are connected so as to be able to communicate with each other The engine test apparatus 100 may be an engine controller that controls the engine 300. The engine test apparatus 100 conducts an engine test by inputting, to the engine 300 on the basis of a test pattern, an operation variable for controlling the engine 300. The test pattern is, for example, a chirp signal or an amplitude-modulated pseudo random binary sequence (APRBS) signal that indicates a time series change in the operation variable. The test pattern is stored in a test pattern 121.

Figure 2:
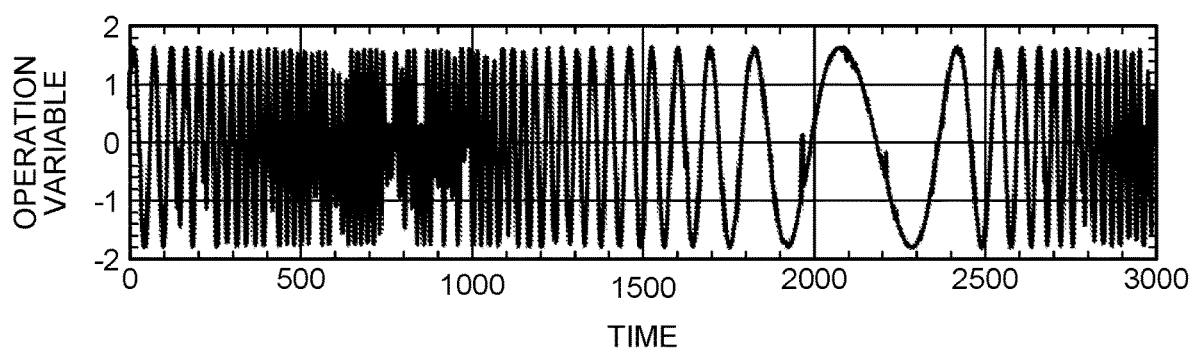
FIG. 2 is a diagram illustrating an example of a chirp signal.

FIG. 2 is a diagram illustrating an example of the chirp signal. In FIG. 2, the horizontal axis of the graph indicates time, whereas the vertical axis indicates a value of an operation variable. As illustrated in FIG. 2, by continuously changing the frequency component with time, the chirp signal allows for implementation of a highly comprehensive test with respect to the test pattern due to the characteristics of the trigonometric functions. Furthermore, the chirp signal is calculated by using, for example, Equation (1) below.

$$y = \sin\left(2\pi\left(f_0 t - \frac{f_1 - f_0}{2T}t^2\right) + \phi\right) \tag{1}$$

In addition, examples of the operation variable include a rotation speed of the engine, an amount of fuel injection, the opening degree of a turbine, the opening degree of an exhaust gas recirculation (EGR) valve, the opening degree of an intake throttle (ITH) valve, and the like. Accordingly, the test pattern, such as the chirp signal, is created for each operation variable.

In addition, as illustrated in FIG. 2, the test pattern is pattern data indicating the time series change in the operation variable, so that the engine test apparatus 100 inputs, on the basis of the test pattern, an operation variable to the engine 300 by changing the operation variable, such as the rotation speed of the engine, the amount of fuel injection, or the like, and controls the engine 300.

In addition, the engine test apparatus 100 performs a simulation of the engine test by inputting, on the basis of the test pattern, a first operation variable to a mathematical model that is obtained by inputting the test pattern and that represents a time series response of an engine. Furthermore, a test pattern modification unit 114 included in the engine test apparatus 100 modifies the test pattern on the basis of the results of the simulation. The modified test pattern is stored in the test pattern 121. The modified test pattern is used for the engine test of the engine 300, so that it is possible to perform more accurately monitoring or controlling of the engine 300, and it is thus possible to conduct an engine test with less man hour. Furthermore, the mathematical model is stored in a mathematical model 122.

Figure 3:
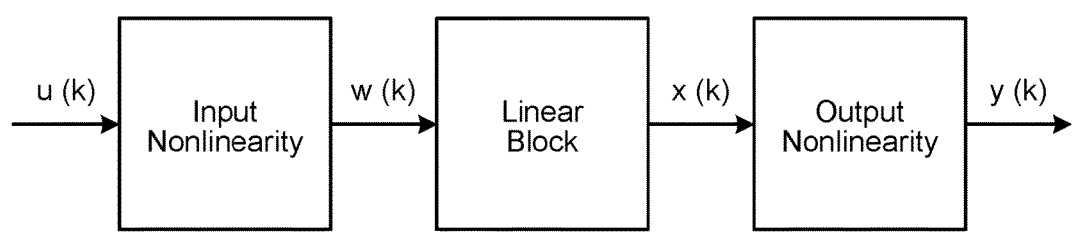
FIG. 3 is a diagram illustrating an example of a mathematical model according to the present embodiment.

The mathematical model according to the present embodiment is exemplified. FIG. 3 is a diagram illustrating an example of the mathematical model according to the present embodiment. The mathematical model illustrated in FIG. 3 is a Hammerstein-Wiener model. The Hammerstein-Wiener model represents the system by resolving the relationship between an input and an output into a linear element and a nonlinear element. Furthermore, the Hammerstein-Wiener model is constituted by three blocks, represents dynamics by a linear transfer function, and gives an input and an output of the linear system by a nonlinear function.

Figure 4:
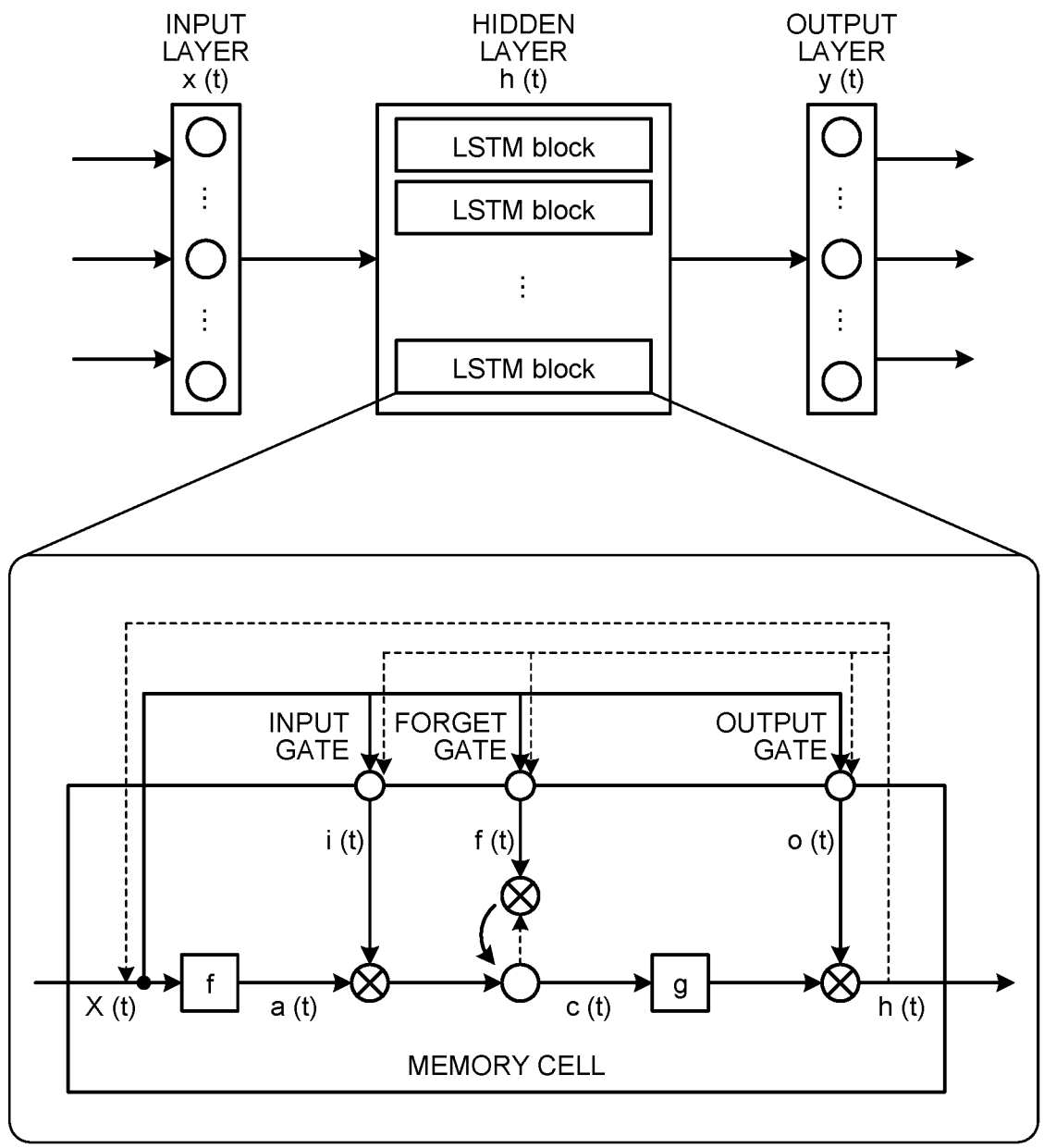
FIG. 4 is a diagram illustrating another example of the mathematical model according to the present embodiment.

FIG. 4 is a diagram illustrating another example of the mathematical model according to the present embodiment. The mathematical model illustrated in FIG. 4 is a machine training model obtained by using a long short term memory (LSTM). The LSTM model has a structure in which each unit in a hidden layer included in a recurrent neural network (RNN) is replaced with a memory called LSTM blocks and three gates. As a result, it is possible to train long term dependence in addition to short term dependence, and it is thus possible to control the engine, with higher accuracy, indicated by the simulation of the engine test.

Each of the parameters in the LSTM model illustrated in FIG. 4 is calculated by using Equations (2) to (7) below.

$$c(t)=i(t)\odot a(t)+f(t)\odot c(t-1) \tag{2}$$

$$i(t)=\sigma(\hat{i}(t))=\sigma(W_i x(t)+U_i h(t-1)+b_i) \tag{3}$$

$$o(t)=\sigma(\hat{o}(t))=\sigma(W_o x(t)+U_o h(t-1)+b_o) \tag{4}$$

$$f(t)=\sigma(\hat{f}(t))=\sigma(W_f x(t)+U_f h(t-1)+b_f) \tag{5}$$

$$a(t)=f(\hat{a}(t))=f(W_a x(t)+U_a h(t-1)+b_a) \tag{6}$$

$$h(t)=o(t)\odot g(c(t)) \tag{7}$$

where, s denotes a sigmoid function, b denotes a bias, W denotes an input weight, U denotes a regression weight, and f and g denote a hyperbolic tangent function (tan h).

The engine test apparatus 100 inputs operation variables on the basis of the test pattern to the mathematical model illustrated in FIG. 3 or FIG. 4, performs a simulation of the engine test, and creates, as a new test pattern, a history of the operation variables that are input at the time of the simulation. As a result, the test pattern is modified. Furthermore, in the simulation of the engine test, the engine test apparatus 100 controls the operation variables on the basis of the monitoring parameters of the engine indicated by the simulation obtained by inputting the operation variable to the mathematical model. The monitoring parameter will be more specifically described.

A data acquisition unit 111 included in the engine test apparatus 100 acquires a monitoring parameter of an engine indicated by a simulation or the engine 300 obtained by inputting the operation variable to the mathematical model or the engine 300 or acquired a controlled variable with respect to an operation variable. The monitoring parameter is a parameter for monitoring a state of the engine in order to prevent engine abnormality from occurring. Specifically, the monitoring parameter is, for example, an air excess ratio, pressure and temperature of an intake manifold, pressure and temperature of an exhaust manifold, the maximum cylinder pressure rise rate, or the like. Furthermore, the data acquisition unit 111 is able to store the operation variables that are input to the mathematical model in an operation variable history 124. In addition, the data acquisition unit 111 is able to store, as the history data of the engine test in a test data history 125, the operation variables that have been input to the engine 300 or the controlled variables that are acquired from the engine 300.

Figure 5:
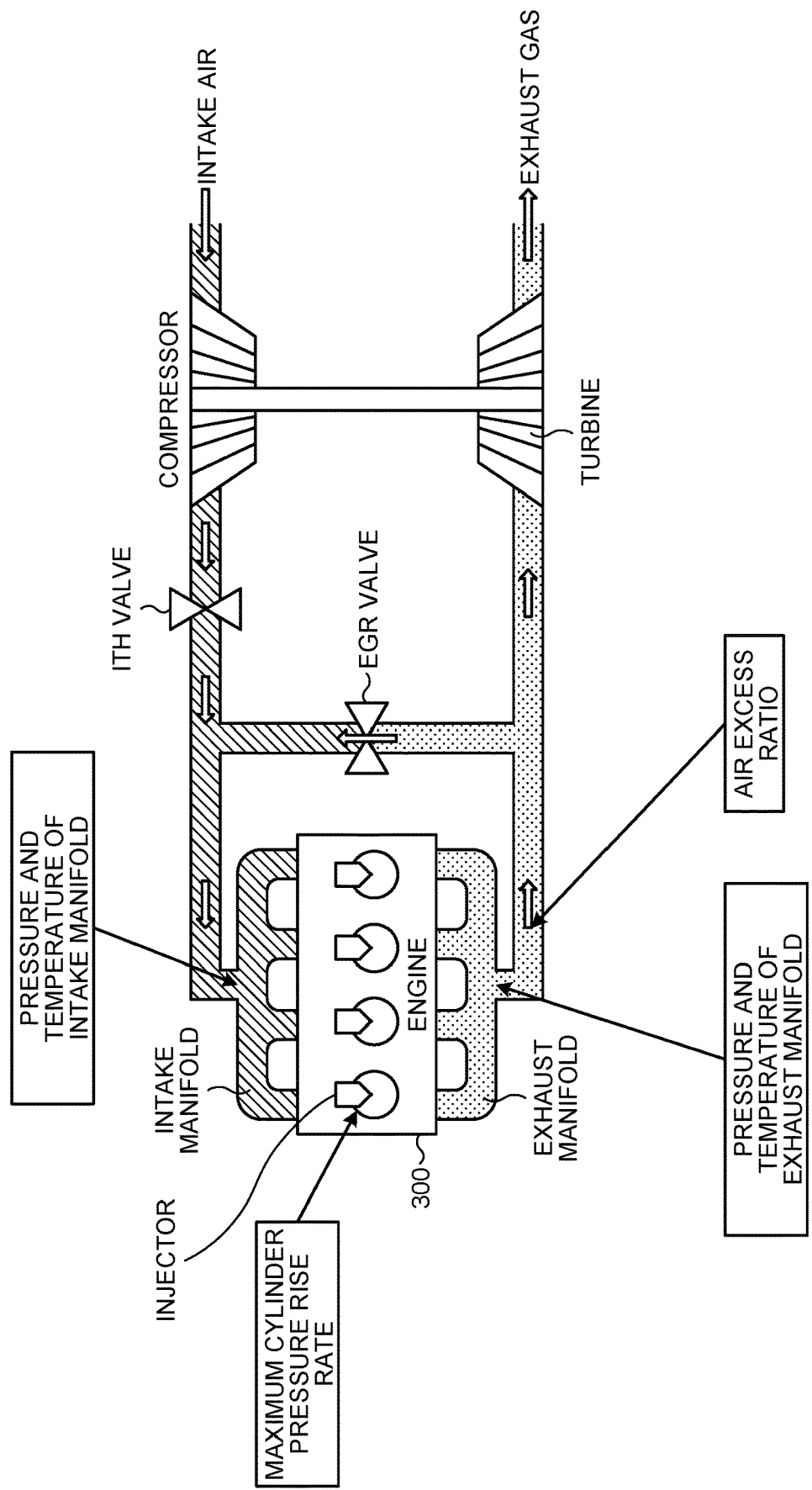
FIG. 5 is a diagram illustrating an example of measurement positions of monitoring parameters according to the present embodiment.

FIG. 5 is a diagram illustrating an example of a measurement position of the monitoring parameter according to the present embodiment. For example, as illustrated in FIG. 5, the pressure and the temperature of the intake manifold that are the monitoring parameters are measured in an intake air channel located at an entrance portion of the intake manifold included in the internal combustion engine. Furthermore, the maximum cylinder pressure rise rate that corresponds to the monitoring parameter is measured inside the cylinder of the engine 300. In addition, the pressure and the temperature of the exhaust manifold and the air excess ratio that correspond to the monitoring parameter are collected by the exhaust manifold included in the internal combustion engine and measured in an exhaust air channel. Furthermore, in a case of the simulation of the engine test performed by using the mathematical model, the monitoring parameter is obtained, as the monitoring parameter for the engine indicated by the simulation, as output data by inputting the operation variable to the mathematical model.

Furthermore, a first threshold value determination unit 112 included in the engine test apparatus 100 determines, in the simulation of the engine test, whether or not the monitoring parameter is within the range of a first threshold value. The first threshold value is the upper limit or the lower limit that is previously set to a threshold value 123 for each monitoring parameter such that the engine indicated by the simulation does not enter an abnormal state. Accordingly, it can be said that the first threshold value is not a threshold value at which the engine indicated by the simulation enters an abnormal state, but is a threshold value for warning that an abnormal state may possibly occur in the case where the operation variable is continuously changed on the basis of the test pattern.

Furthermore, a second threshold value determination unit 115 included in the engine test apparatus 100 determines, in the engine test of the engine 300, whether or not the monitoring parameter is within the range of a second threshold value. The second threshold value is the upper limit or the lower limit that is previously set to the threshold value 123 for each monitoring parameter such that the engine 300 does not enter an abnormal state. Accordingly, it can be said that the second threshold value is not a threshold value at which the engine 300 enters an abnormal state, but is a threshold value for warning that an abnormal state may possibly occur in the case where the operation variable is continuously changed on the basis of the test pattern without changing anything.

The monitoring parameter is defined and monitored for each operation variable. FIG. 6 is a diagram illustrating an example of a combination of the monitoring parameter and the operation variable according to the present embodiment. The combination illustrated in FIG. 6 is an example; however, for example, the air excess ratio included in the monitoring parameter is monitored when one of the amount of fuel injection, the opening degree of the turbine, the opening degree of the EGR valve, and the opening degree of the ITH valve is operated. In contrast, the maximum cylinder pressure rise rate included in the monitoring parameter is monitored when the amount of fuel injection is operated. Furthermore, in a precise sense, an amount of operation of each of the operation variables possibly affects all of the monitoring parameters, so that the engine test apparatus 100 is also able to monitor all of the monitoring parameters at the time of an input and an operation of each of the operation variables to the mathematical model or the engine 300. However, as illustrated in FIG. 6, by previously setting the combination of the monitoring parameters that generate a great influence on the operation variables and classifying the monitoring parameter into each operation variable, it is possible to perform more accurately monitoring or controlling of the mathematical model or the engine 300.

Figure 7:
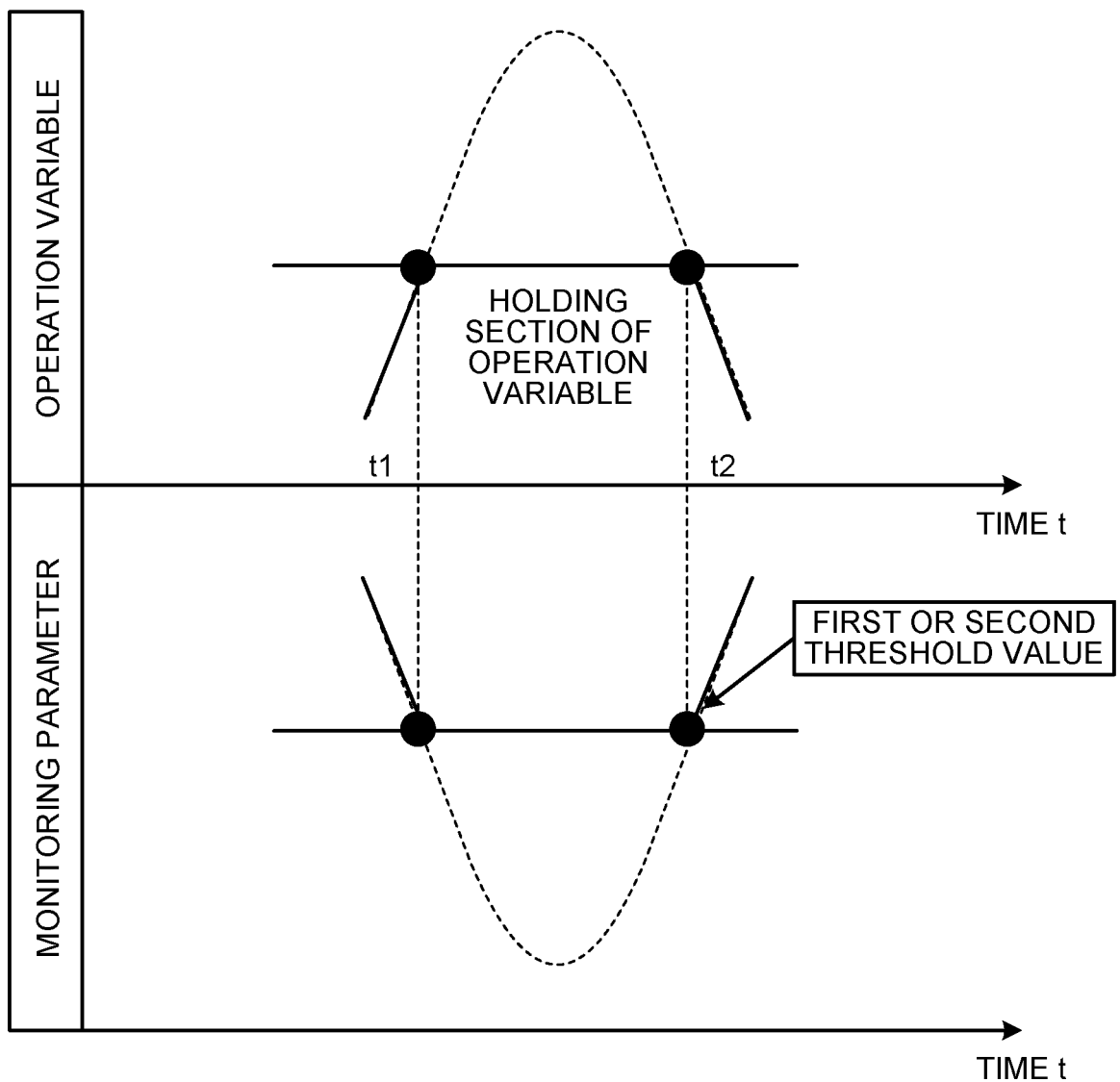
FIG. 7 is a diagram illustrating an example of determination of a monitoring parameter according to the present embodiment.

FIG. 7 is a diagram illustrating an example of determination of the monitoring parameter according to the present embodiment. FIG. 7 indicates a temporal transition of the operation variable that is input to the mathematical model or the engine 300 and the monitoring parameter that is obtained from the mathematical model or the engine 300. Furthermore, in order to collectively explain the monitoring parameters obtained from the mathematical model and the engine 300, FIG. 7 illustrates the first threshold value and the second threshold value as the threshold value of the monitoring parameter. In the example illustrated in FIG. 7, the first threshold value is a threshold value that is associated with the first monitoring parameter and that is obtained from the mathematical model, whereas the second threshold value is a threshold value that is associated with the second monitoring parameter and that is obtained from the engine 300. Accordingly, the first threshold value and the second threshold value may be different values.

As illustrated in FIG. 7, if the monitoring parameter exceeds the first threshold value or the second threshold value (at t1), the engine test apparatus 100 holds the operation variable until the monitoring parameter is less than the first threshold value (at t2). As a result of this, the engine test apparatus 100 performs control such that the engine indicated by the simulation performed by using the mathematical model or the engine 300 does not enter an abnormal state. Furthermore, FIG. 7 illustrates a case in which a single operation variable is held with respect to the monitoring parameter; however, a plurality of operation variables may be held with respect to a single monitoring parameter. In addition, the engine test apparatus 100 is able to monitor a plurality of monitoring parameters and hold one or a plurality of operation variables associated with the monitoring parameters; however, the operation variables to be held may be determined on the basis of the priority that is previously set to the plurality of monitoring parameters.

Furthermore, in the example illustrated in FIG. 7, the lower limit of the monitoring parameter is set as the first threshold value and the second threshold value; however, the upper limit may be set, or both of the upper limit and the lower limit may be set. In addition, the setting of the upper limit and the lower limit of this type of the monitoring parameters may be set for each monitoring parameter.

As described above, an operation variable decision unit 113 included in the engine test apparatus 100 decides a subsequent operation variable within the range in which the monitoring parameter does not enter an abnormal state with respect to the engine indicated by the simulation performed by using the mathematical model or the engine 300, and then, controls the operation variable. Then, the engine test apparatus 100 inputs the decided operation variable to the mathematical model or the engine 300, and controls the engine indicated by the simulation or the engine 300. Furthermore, the operation variable that is decided with respect to the monitoring parameter may be performed on the basis of the combination illustrated in, for example, FIG. 6. Furthermore, the operation variable decision unit 113 is able to store, in the operation variable history 124 and the test data history 125, each of the operation variables that are input to the mathematical model and the engine 300 as the history data.

The engine 300 is a real engine of an automobile. The engine 300 is operated by the operation variable that is input by the engine test apparatus 100. Furthermore, the operation variable that is input to the engine 300 is a history of the operation variable that is input at the time of simulation performed on the engine test using the mathematical model, that is, the operation variable based on the modified test pattern. Accordingly, in FIG. 1, the operation variable that is input to the engine 300 is defined as the final value.

In addition, the engine 300 returns, to the engine test apparatus 100, the controlled variable or the monitoring parameter with respect to the operation variable obtained by inputting the operation variable. In a precise sense, each of the pieces of data is acquired by the engine test apparatus 100, rather than being returned to the engine test apparatus 100.

Flow of Process

Figure 8:
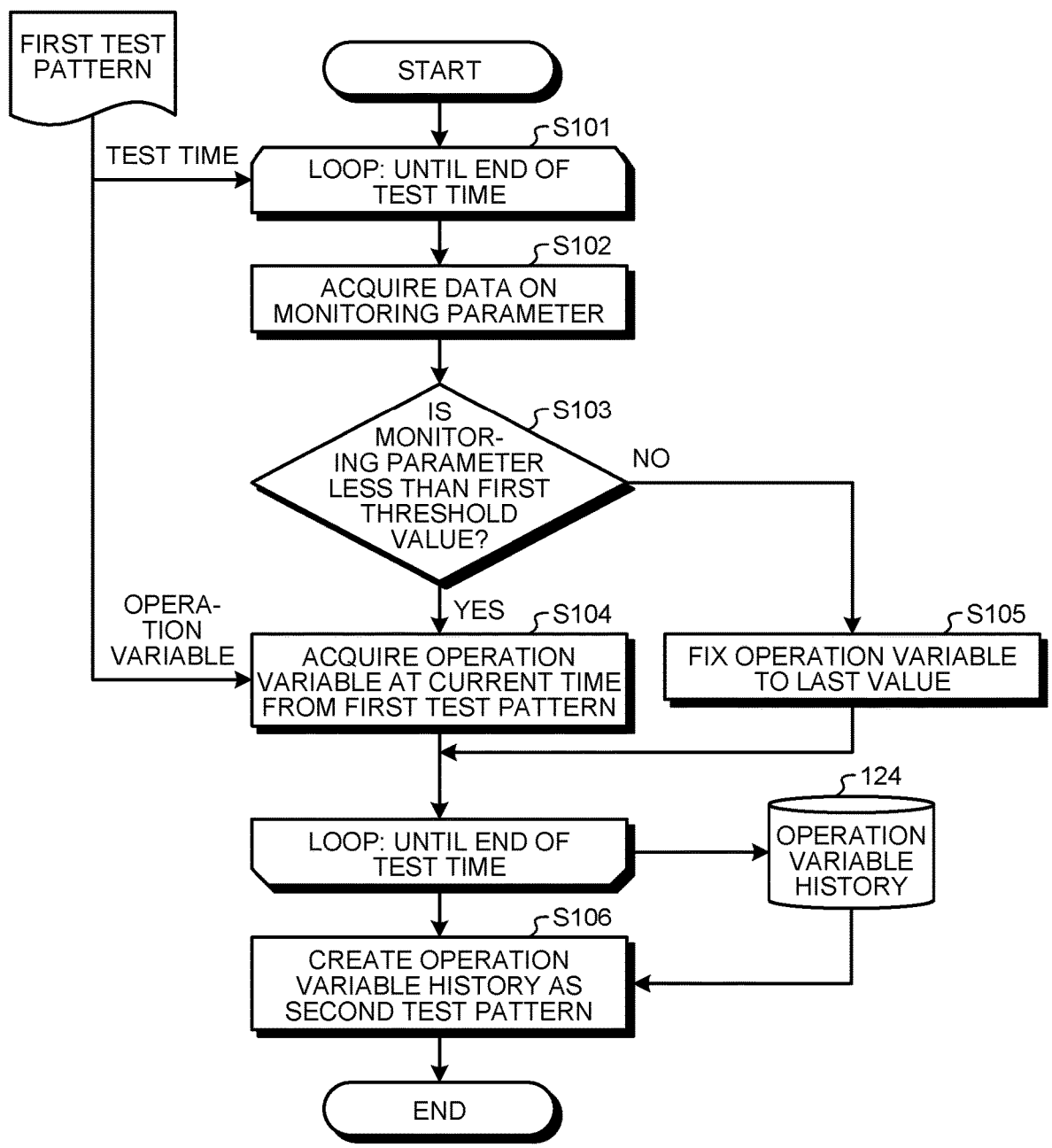
FIG. 8 is a flowchart illustrating an example of the flow of a simulation process performed by an engine test apparatus 100 according to the present embodiment.

In the following, the flow of a simulation process of the engine test performed by the engine test apparatus 100 will be described with reference to FIG. 8. FIG. 8 is a flowchart illustrating an example of the flow of the simulation process performed by the engine test apparatus 100 according to the present embodiment. The simulation process illustrated in FIG. 8 is started at an arbitrary timing.

First, the engine test apparatus 100 acquires a first test pattern stored in the test pattern 121 and inputs an operation variable to the mathematical model on the basis of the first test pattern, so that the simulation is started (Step S101). A loop of the process is started by the process performed at Step S101.

Then, the engine test apparatus 100 acquires each of the monitoring parameters as a response received from the mathematical model in which the operation variable is input at Step S101 (Step S102).

Then, the engine test apparatus 100 determines, for each monitoring parameter, whether or not the acquired monitoring parameter is less than the first threshold value (Step S103). In addition, the determination performed at Step S103 may be performed to determine whether or not the monitoring parameter is less than or equal to the first threshold value.

If all of the monitoring parameters are less than the first threshold value (Yes at Step S103), the engine test apparatus 100 acquires the operation variable that is associated with the current test time from the first test pattern (Step S104). The acquired operation variable is input to the mathematical model as the subsequent operation variable. Then, if it is within the test time, the process returns to Step S102 and is repeated until the end of the test time. Furthermore, the engine test apparatus 100 stores, as the history data of the operation variable in the operation variable history 124 for each loop, the operation variable that is input to the mathematical model.

Then, after the end of the test time, the engine test apparatus 100 creates the history data of the operation variable stored in the operation variable history 124 as the modified test pattern, that is, a second test pattern (Step S106). After the process at Step S106 has been performed, the simulation process of the engine test illustrated in FIG. 8 ends.

In contrast, if one of the monitoring parameters exceeds the first threshold value (No at Step S103), the engine test apparatus 100 fixes (holds) the operation variable to a last time value (Step S105). Here, the last time value of the operation variable is, for example, the latest operation variable that is input to the mathematical model. Furthermore, the operation variable that is held may be the operation variable that is associated with the monitoring parameter and that exceeds the first threshold value indicated by the combination illustrated in FIG. 6, or may be all of the operation variables.

After the process at Step S105 has been performed, if it is within the test time, the process returns to Step S102 and is repeated until the test time ends after the hold of the operation variable is released. In contrast, in the case of the end of the test time, the engine test apparatus 100 performs the process at Step S106 and ends the simulation process of the engine test illustrated in FIG. 8 after having performed the process at Step S106.

Figure 9:
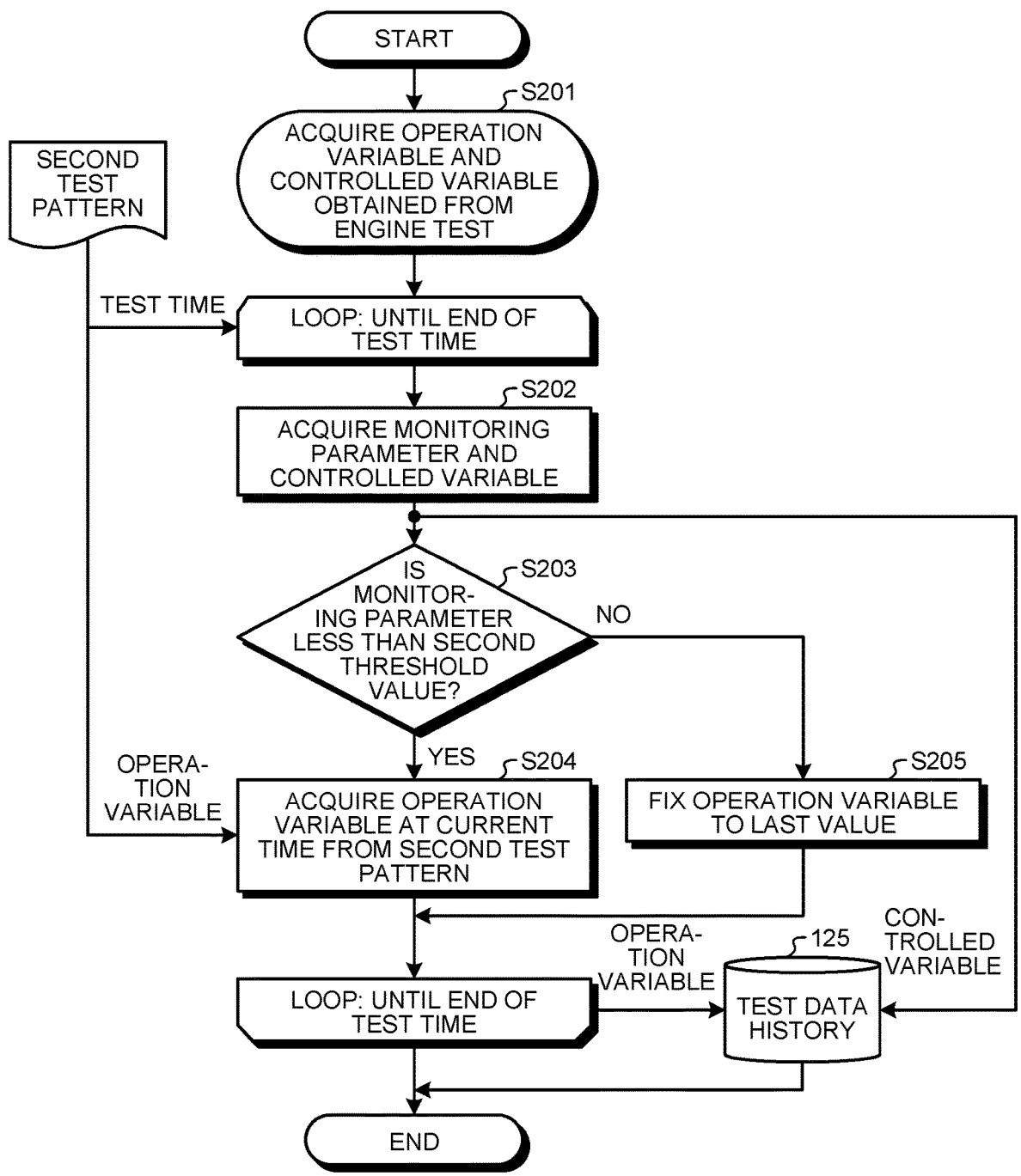
FIG. 9 is a flowchart illustrating an example of the flow of an engine test process performed by an information processing apparatus 200 according to the present embodiment.

In the following, the flow of an engine test process performed by the engine test apparatus 100 will be described with reference to FIG. 9. FIG. 9 is a flowchart illustrating an example of the flow of the engine test process performed by the engine test apparatus 100 according to the present embodiment. The engine test process illustrated in FIG. 9 is started at an arbitrary timing after the engine 300 is started.

First, the engine test apparatus 100 acquires, from the engine 300, the current operation variable, that is, the initial value of each of the operation variables, that has been input to the engine 300 and acquires the controlled variable that is obtained by inputting the operation variable (Step S201). As illustrated in FIG. 9, after the process at Step S201 has been performed, the test pattern that has been modified by the information processing apparatus 200, that is, the second test pattern, is obtained on the basis of the simulation result of the engine test, and then, an engine test and a loop of the process are started.

Then, the engine test apparatus 100 acquires, from the engine 300, each of the monitoring parameters and the controlled variable that are obtained by inputting the operation variable (Step S202). In addition, at Step S202 that is performed at the first time immediately after the start of the loop, the controlled variable has already been acquired at Step S201, so that the controlled variable need not be acquired again. Furthermore, the engine test apparatus 100 stores, in the test data history 125, the controlled variable acquired at Step S201 or Step S202 as the history data of the engine test.

Then, the engine test apparatus 100 determines, for each monitoring parameter, whether or not the acquired monitoring parameter is less than the second threshold value (Step S203). Furthermore, the determination performed at Step S203 may be performed to determine whether or not the monitoring parameter is less than or equal to the second threshold value.

If all of the monitoring parameters are less than the second threshold value (Yes at Step S203), the engine test apparatus 100 acquires the operation variable that is associated with the current test time from the second test pattern (Step S204). The acquired operation variable is input to the engine 300 as the subsequent operation variable. Then, if it is within the test time, the process returns to Step S202 and is repeated until the end of the test time. In contrast, in the case of the end of the test time, the engine test process illustrated in FIG. 9 ends. Furthermore, the engine test apparatus 100 stores, for each loop in the test data history 125, the operation variable that is input to the engine 300 as the history data of the engine test.

In contrast, if one of the monitoring parameters exceeds the second threshold value (No at Step S203), the engine test apparatus 100 fixes (holds) the operation variable to a last time value (Step S205). Here, the last time value of the operation variable is, for example, the latest operation variable that is input to the engine 300. Furthermore, the operation variable that is held may be the operation variable that is associated with the monitoring parameter and that exceeds the second threshold value indicated by the combination illustrated in FIG. 6, or may be all of the operation variables.

After the process at Step S205 has been performed, if it is within the test time, the process returns to Step S202 and is repeated until the test time ends after the hold of the operation variable is released. In contrast, in the case of the end of the test time, the engine test process illustrated in FIG. 9 ends.

As described above, the engine test apparatus 100 acquires the first test pattern in which the operation variable that is used for the engine test is changed in time series; inputs, on the basis of the first test pattern, the first operation variable to the mathematical model that represents a time series response of an engine obtained by inputting a test pattern as a simulation of the engine test; monitors, as the first monitoring parameter of engine abnormality, at least one of the air excess ratio, the pressure and the temperature of the intake manifold, the pressure and the temperature of the exhaust manifold, and the maximum cylinder pressure rise rate that are obtained by inputting the first operation variable to the mathematical model; holds, when the first monitoring parameter exceeds the first threshold value, the first operation variable until the first monitoring parameter is less than the first threshold value; creating a history of the first operation variable in the simulation as the second test pattern; monitoring, as the second monitoring parameter, at least one of the air excess ratio, the pressure and the temperature of the intake manifold, the pressure and the temperature of the exhaust manifold, and the maximum cylinder pressure rise rate that are obtained by inputting the second operation variable to the engine 300 on the basis of the second test pattern; holding, when the second monitoring parameter exceeds the second threshold value, the second operation variable until the second monitoring parameter is less than the second threshold value; and acquiring time series data of the second operation variable and a controlled variable.

As described above, the engine test apparatus 100 controls the operation variable on the basis of the monitoring parameter that is obtained by inputting, to the engine 300, the operation variable that is based on the test pattern modified by the simulation of the engine test conducted by using the mathematical model. As a result of this, it is possible to eliminate trial and error at the time of creation of the test pattern, and it is thus possible to conduct the engine test with less man hour.

Furthermore, the process of acquiring the first test pattern performed by the engine test apparatus 100 includes a process of acquiring, as the first test pattern, a chirp signal or an APRBS signal that indicates a time series change in the first operation variable; and the process of creating the second test pattern performed by the engine test apparatus 100 includes a process of generating, as the second test pattern, the chirp signal or the APRBS signal that indicates a time series change of the second operation variable.

As a result of this, the engine test apparatus 100 is able to conduct a highly comprehensive engine test.

Furthermore, the engine test apparatus 100 sets the upper limit or the lower limit of the first monitoring parameter as the first threshold value, and sets the upper limit or the lower limit of the second monitoring parameter as the second threshold value.

As a result of this, the engine test apparatus 100 is able to perform control, with higher accuracy, such that the engine 300 does not enter an abnormal state.

Furthermore, the engine test apparatus 100 sets both of the upper limit and the lower limit of the first monitoring parameter as the first threshold value, and sets both of the upper limit and the lower limit of the second monitoring parameter as the second threshold value.

As a result of this, the engine test apparatus 100 is able to perform control, with higher accuracy, such that the engine 300 does not enter an abnormal state.

Furthermore, the process of holding the first operation variable performed by the engine test apparatus 100 includes a process of holding a single piece of the first operation variable with respect to a single piece of the first monitoring parameter; and the process of holding the second operation variable performed by the engine test apparatus 100 includes a process of holding a single piece of the second operation variable with respect to a single piece of the second monitoring parameter.

As a result of this, the engine test apparatus 100 is able to perform monitoring or controlling of the engine 300 with higher accuracy.

Furthermore, the process of holding the first operation variable performed by the engine test apparatus 100 includes a process of holding a plurality of pieces of the first operation variables with respect to a single piece of the first monitoring parameter; and the process of holding the second operation variable performed by the engine test apparatus 100 includes a process of holding a plurality of pieces of the second operation variables with respect to a single piece of the second monitoring parameter.

As a result of this, the engine test apparatus 100 is able to perform monitoring or controlling of the engine 300 with higher accuracy.

Furthermore, the process of holding the first operation variable performed by the engine test apparatus 100 includes a process of holding the first operation variable on the basis of a first priority with respect to the first monitoring parameter; and the process of holding the second operation variable performed by the engine test apparatus 100 includes a process of holding the second operation variable on the basis of a second priority with respect to the second monitoring parameter.

As a result of this, the engine test apparatus 100 is able to perform monitoring or controlling of the engine 300 with higher accuracy.

Furthermore, the process of inputting the first operation variable to the mathematical model performed by the engine test apparatus 100 includes a process of inputting the first operation variable to a Hammerstein-Wiener model as the mathematical model.

As a result of this, the engine test apparatus 100 is able to perform the simulation of the engine test with higher accuracy.

Furthermore, the process of inputting the first operation variable to the mathematical model performed by the engine test apparatus 100 includes a process of inputting the first operation variable to the mathematical model that is constructed by one of a DNN, a RNN, and a LSTM.

As a result of this, the engine test apparatus 100 is able to perform the simulation of the engine test with higher accuracy.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. For example, the operation variable decision unit 113 included in the engine test apparatus 100 may be separated into a plurality of processing units, or the first threshold value determination unit 112 and the second threshold value determination unit 115 included in the engine test apparatus 100 may be integrated as a single processing unit. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Hardware

Figure 10:
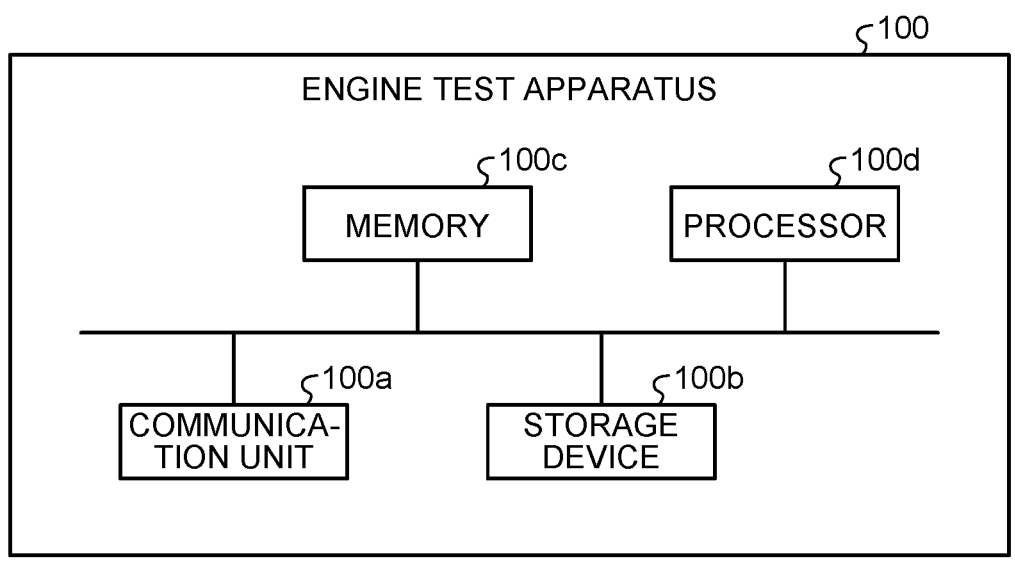
FIG. 10 is a diagram illustrating a hardware configuration example of the engine test apparatus 100 according to the present embodiment.

FIG. 10 is a diagram illustrating a hardware configuration example of the engine test apparatus 100 according to the present embodiment. As illustrated in FIG. 10, the engine test apparatus 100 includes a communication unit 100a, a storage device 100b, a memory 100c, and a processor 100d. Furthermore, each of the units illustrated in FIG. 10 is connected each other via a bus or the like.

The communication unit 100a is a network interface card or the like, and communicates with another information processing apparatus or the like. The storage device 100b stores therein the programs and data that operate each of the functions of the engine test apparatus 100 illustrated in FIG. 1.

The processor 100d reads the program that operates each of the functions or the like of the engine test apparatus 100 illustrated in FIG. 1 from the storage device 100b or the like. Then, the processor 100d executes the process that implements each of the functions of the engine test apparatus 100 illustrated in FIG. 1 by loading the read program into the memory 100c.

Furthermore, the engine test apparatus 100 is able to implement each of the functions by reading the programs that operates each of the functions of the engine test apparatus 100 illustrated in FIG. 1 from a recording medium by a medium recording device and executing the read programs. Furthermore, the programs described in another embodiment are not limited to be executed by the engine test apparatus 100. For example, the present invention may also be similarly used in a case in which another information processing apparatus executes a program or a case in which the engine test apparatus 100 and the other information processing apparatus execute cooperatively execute the program with each other.

Furthermore, the programs that executes each of the functions of the engine test apparatus 100 illustrated in FIG. 1 may be distributed via a network, such as the Internet. Furthermore, the programs may be executed by storing the programs in recording medium that can be read by a computer readable medium, such as a hard disk (HDD), a solid state drive (SSD), a flexible disk (FD), a CD-ROM, a magneto-optical disk (MO), a digital versatile disk (DVD), or the like, and read the programs from the recording medium by the computer.

According to an aspect of an embodiment, it is possible to conduct an engine test with less man hour.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An engine test method that causes a computer to execute a process comprising:
    acquiring, by a processer on the computer, a first test pattern in which an operation variable that is used for an engine test is changed in time series;
    inputting, based on the first test pattern, a first operation variable to a mathematical model that represents a time series response of an engine obtained by inputting a test pattern as a simulation of the engine test;
    monitoring, as a first monitoring parameter of engine abnormality, at least one of an air excess ratio, pressure and temperature of an intake manifold, pressure and temperature of an exhaust manifold, and a maximum cylinder pressure rise rate that are obtained by inputting the first operation variable to the mathematical model;
    holding, when the first monitoring parameter exceeds a first threshold value, the first operation variable until the first monitoring parameter is less than the first threshold value;
    creating a history of the first operation variable in the simulation as a second test pattern;
    monitoring, as a second monitoring parameter, at least one of the air excess ratio, the pressure and the temperature of the intake manifold, the pressure and the temperature of the exhaust manifold, and the maximum cylinder pressure rise rate that are obtained by inputting a second operation variable to a real engine based on the second test pattern;
    holding, when the second monitoring parameter exceeds a second threshold value, the second operation variable until the second monitoring parameter is less than the second threshold value; and
    acquiring time series data of the second operation variable and a controlled variable.

2. The engine test method according to claim 1, wherein
    the acquiring the first test pattern includes acquiring, as the first test pattern, a chirp signal or an amplitude-modulated pseudo random binary sequence (APRBS) signal indicating a time series change in the first operation variable, and
    the creating the second test pattern includes generating, as the second test pattern, a chirp signal or an APRBS signal indicating a time series change of the second operation variable.

3. The engine test method according to claim 1, wherein the process further comprises:
    setting an upper limit or a lower limit of the first monitoring parameter as the first threshold value; and
    setting an upper limit or a lower limit of the second monitoring parameter as the second threshold value.

4. The engine test method according to claim 1, wherein the process further comprises:
    setting both of an upper limit and a lower limit of the first monitoring parameter as the first threshold value; and
    setting both of an upper limit and a lower limit of the second monitoring parameter as the second threshold value.

5. The engine test method according to claim 1, wherein
    the holding the first operation variable includes holding a single piece of the first operation variable with respect to a single piece of the first monitoring parameter, and
    the holding the second operation variable includes holding a single piece of the second operation variable with respect to a single piece of the second monitoring parameter.

6. The engine test method according to claim 1, wherein
    the holding the first operation variable includes holding a plurality of pieces of the first operation variables with respect to a single piece of the first monitoring parameter, and the holding the second operation variable includes holding a plurality of pieces of the second operation variable with respect to a single piece of the second monitoring parameter.

7. The engine test method according to claim 1, wherein
the holding the first operation variable includes holding the first operation variable based on a first priority with respect to the first monitoring parameter, and
the holding the second operation variable includes holding the second operation variable based on a second priority with respect to the second monitoring parameter.

8. The engine test method according to claim 1, wherein the inputting the first operation variable to the mathematical model includes inputting the first operation variable to a Hammerstein-Wiener model as the mathematical model.

9. The engine test method according to claim 1, wherein the inputting the first operation variable to the mathematical model includes inputting the first operation variable to the mathematical model that is constructed one of a deep neural network (DNN), a recurrent neural network (RNN), and a long short term memory (LSTM).

10. A non-transitory computer-readable recording medium having stored therein an engine test program that causes a computer to execute a process comprising:
acquiring a first test pattern in which an operation variable that is used for an engine test is changed in time series;
inputting, based on the first test pattern, a first operation variable to a mathematical model that represents a time series response of an engine obtained by inputting a test pattern as a simulation of the engine test;
monitoring, as a first monitoring parameter of engine abnormality, at least one of an air excess ratio, pressure and temperature of an intake manifold, pressure and temperature of an exhaust manifold, and a maximum cylinder pressure rise rate that are obtained by inputting the first operation variable to the mathematical model;
holding, when the first monitoring parameter exceeds a first threshold value, the first operation variable until the first monitoring parameter is less than the first threshold value;
creating a history of the first operation variable in the simulation as a second test pattern;
monitoring, as a second monitoring parameter, at least one of the air excess ratio, the pressure and the temperature of the intake manifold, the pressure and the temperature of the exhaust manifold, and the maximum cylinder pressure rise rate that are obtained by inputting a second operation variable to a real engine based on the second test pattern;
holding, when the second monitoring parameter exceeds a second threshold value, the second operation variable until the second monitoring parameter is less than the second threshold value; and
acquiring time series data of the second operation variable and a controlled variable.

11. The non-transitory computer-readable recording medium according to claim 10, wherein
the acquiring the first test pattern includes acquiring, as the first test pattern, a chirp signal or an amplitude-modulated pseudo random binary sequence (APRBS) signal indicating a time series change in the first operation variable, and
the creating the second test pattern includes generating, as the second test pattern, a chirp signal or an APRBS signal indicating a time series change of the second operation variable.

12. The non-transitory computer-readable recording medium according to claim 10, wherein the process further comprises:
setting an upper limit or a lower limit of the first monitoring parameter as the first threshold value; and
setting an upper limit or a lower limit of the second monitoring parameter as the second threshold value.

13. The non-transitory computer-readable recording medium according to claim 10, wherein the process further comprises:
setting both of an upper limit and a lower limit of the first monitoring parameter as the first threshold value; and
setting both of an upper limit and a lower limit of the second monitoring parameter as the second threshold value.

14. The non-transitory computer-readable recording medium according to claim 10, wherein
the holding the first operation variable includes holding a single piece of the first operation variable with respect to a single piece of the first monitoring parameter, and
the holding the second operation variable includes holding a single piece of the second operation variable with respect to a single piece of the second monitoring parameter.

15. The non-transitory computer-readable recording medium according to claim 10, wherein
the holding the first operation variable includes holding a plurality of pieces of the first operation variables with respect to a single piece of the first monitoring parameter, and
the holding the second operation variable includes holding a plurality of pieces of the second operation variable with respect to a single piece of the second monitoring parameter.

16. The non-transitory computer-readable recording medium according to claim 10, wherein
the holding the first operation variable includes holding the first operation variable based on a first priority with respect to the first monitoring parameter, and
the holding the second operation variable includes holding the second operation variable based on a second priority with respect to the second monitoring parameter.

17. The non-transitory computer-readable recording medium according to claim 10, wherein the inputting the first operation variable to the mathematical model includes inputting the first operation variable to a Hammerstein-Wiener model as the mathematical model.

18. The non-transitory computer-readable recording medium according to claim 10, wherein the inputting the first operation variable to the mathematical model includes inputting the first operation variable to the mathematical model that is constructed one of a deep neural network (DNN), a recurrent neural network (RNN), and a long short term memory (LSTM).

19. An engine test apparatus comprising a controller that executes a process comprising:
acquiring a first test pattern in which an operation variable that is used for an engine test is changed in time series;
inputting, based on the first test pattern, a first operation variable to a mathematical model that represents a time series response of an engine obtained by inputting a test pattern as a simulation of the engine test;
monitoring, as a first monitoring parameter of engine abnormality, at least one of an air excess ratio, pressure and temperature of an intake manifold, pressure and temperature of an exhaust manifold, and a maximum cylinder pressure rise rate that are obtained by inputting the first operation variable to the mathematical model;

holding, when the first monitoring parameter exceeds a first threshold value, the first operation variable until the first monitoring parameter is less than the first threshold value;

creating a history of the first operation variable in the simulation as a second test pattern;

monitoring, as a second monitoring parameter, at least one of the air excess ratio, the pressure and the temperature of the intake manifold, the pressure and the temperature of the exhaust manifold, and the maximum cylinder pressure rise rate that are obtained by inputting a second operation variable to a real engine based on the second test pattern;

holding, when the second monitoring parameter exceeds a second threshold value, the second operation variable until the second monitoring parameter is less than the second threshold value; and acquiring time series data of the second operation variable and a controlled variable.

20. The engine test apparatus according to claim 19, wherein
the acquiring the first test pattern includes acquiring, as the first test pattern, a chirp signal or an amplitude-modulated pseudo random binary sequence (APRBS) signal indicating a time series change in the first operation variable, and
the creating the second test pattern includes generating, as the second test pattern, a chirp signal or an APRBS signal indicating a time series change of the second operation variable.

21. The engine test apparatus according to claim 19, wherein the controller executes the process further comprises:
setting an upper limit or a lower limit of the first monitoring parameter as the first threshold value; and
setting an upper limit or a lower limit of the second monitoring parameter as the second threshold value.

22. The engine test apparatus according to claim 19, wherein the controller executes the process further comprises:
setting both of an upper limit and a lower limit of the first monitoring parameter as the first threshold value; and setting both of an upper limit and a lower limit of the second monitoring parameter as the second threshold value.

23. The engine test apparatus according to claim 19, wherein
the holding the first operation variable includes holding a single piece of the first operation variable with respect to a single piece of the first monitoring parameter, and
the holding the second operation variable includes holding a single piece of the second operation variable with respect to a single piece of the second monitoring parameter.

24. The engine test apparatus according to claim 19, wherein
the holding the first operation variable includes holding a plurality of pieces of the first operation variables with respect to a single piece of the first monitoring parameter, and
the holding the second operation variable includes holding a plurality of pieces of the second operation variable with respect to a single piece of the second monitoring parameter.

25. The engine test apparatus according to claim 19, wherein
the holding the first operation variable includes holding the first operation variable based on a first priority with respect to the first monitoring parameter, and
the holding the second operation variable includes holding the second operation variable based on a second priority with respect to the second monitoring parameter.

26. The engine test apparatus according to claim 19, wherein the inputting the first operation variable to the mathematical model includes inputting the first operation variable to a Hammerstein-Wiener model as the mathematical model.

27. The engine test apparatus according to claim 19, wherein the inputting the first operation variable to the mathematical model includes inputting the first operation variable to the mathematical model that is constructed one of a deep neural network (DNN), a recurrent neural network (RNN), and a long short term memory (LSTM).

* * * * *